United States Patent [19]
McNinch et al.

[11] Patent Number: 5,568,490
[45] Date of Patent: Oct. 22, 1996

[54] METHOD AND DEVICE FOR TRANSFERRING DATA IN A TDMA SYSTEM

[75] Inventors: Wayne McNinch, Monrovia; Daniel Wendling, Darnestown; Chris Weaver, Takoma Park, all of Md.

[73] Assignee: Hughes Electronics, Los Angeles, Calif.

[21] Appl. No.: 258,160

[22] Filed: Jun. 10, 1994

[51] Int. Cl.$^6$ .......................................... H04J 3/02
[52] U.S. Cl. .......................... 370/58.2; 370/85.1; 370/95.3
[58] Field of Search ................................ 370/95.3, 81, 51, 370/85.1, 95.2, 119, 77, 56, 85.2, 85.7, 85.9, 85.11, 85.13, 85.6; 395/11, 275, 325, 375, 425, 725, 775; 379/333, 334, 93, 94; 364/130, 131, 133, 134, 138, 230, 232.22, 232.8; 375/219, 222

[56] References Cited

U.S. PATENT DOCUMENTS

| | | |
|---|---|---|
| 4,972,314 | 11/1990 | Getzinger et al. .................... 364/200 |
| 5,251,208 | 10/1993 | Canniff et al. ........................ 370/77 |
| 5,297,142 | 3/1994 | Paggeot et al. ....................... 370/85.6 |
| 5,299,189 | 3/1994 | Takahashi ............................. 370/85.1 |

*Primary Examiner*—Alpus H. Hsu
*Assistant Examiner*—Ricky Ngo
*Attorney, Agent, or Firm*—Gordon R. Lindeen, III; Wanda K. Denson-Low

[57] ABSTRACT

A data transfer device for transferring data between a plurality of digital signal processors in a system utilizing time division multiple access techniques. The data transfer device includes a system controller coupled to a bus network, a plurality of dual port random access memories, and a direct memory access controller. Each dual port random access memory device includes a first input/output port coupled to one of the plurality of digital signal processors, and a second input/output port coupled to the bus network. Each of the plurality of digital signal processors can access the dual port random access memory device coupled thereto during a first predefined time within a TDMA cycle. During a second predefined time period within the same TDMA cycle, the direct memory access controller, under control of the system controller, transfers data directly between the dual port random access memory devices. During a third predefined time period within the same TDMA cycle, the system controller can access the dual port random access memory devices coupled thereto.

20 Claims, 4 Drawing Sheets

METHOD AND DEVICE FOR TRANSFERRING DATA IN A TDMA SYSTEM

BACKGROUND OF THE INVENTION

The use of Time Division Multiple Access ("TDMA") and Digital Speech Interpolation ("DSI") techniques have proven useful for optimizing the transmission and receiving capabilities of various communication systems. DSI is particularly useful in telephony systems because it allows the system to take advantage of the silent intervals in normal speech patterns. Application of these techniques provides for a more efficient transfer of data between the various units of a system, for example a cellular telephone system comprising a base station and remote units. The techniques also provide for a more efficient transfer of data between different modules contained within a single unit.

Such systems typically allow each unit to access or transmit data for a portion of time within a periodic cycle, hereinafter referred to as a TDMA cycle. The minimum duration of the TDMA cycle is a function of system requirements, for example, the number of units which need to transmit or receive data each cycle.

With regard to the transfer of data between a plurality of modules within a single unit, it is desirable to transfer the data between the modules as fast as possible. If the time allocated for data transfer in a predefined TDMA cycle is minimized there are numerous benefits. For example, more time can be allocated for processing data, or alternatively, the minimum duration of the TDMA cycle can be decreased.

Heretofore, systems utilized "busy" or "semaphore" arbitration to determine whether a digital signal processor ("DSP") contained on a module or the memory associated therewith, was available to transmit or receive data from another module. However, the "busy" and "semaphore" arbitration schemes require the transmitting/receiving module to request access to the destination module, and then wait for a reply from the destination module, prior to sending or retrieving data. If the destination module is presently unavailable, the data transfer request must be either held open or forwarded again. In the case of digital signal processors or RISC processors which typically have short instructions cycle periods, wait states may have to be inserted for any dual port random access memory ("RAM") devices to accommodate valid "busy" timing. Additionally, buffering delays associated with multiple modules interfaced by way of a common backplane can also require additional wait states to accommodate dual port RAM "busy" timing. Thus, such arbitration schemes utilize a portion of the TDMA cycle to determine if data can be transferred between modules and, as a result, the overall processing efficiency of the system is reduced.

Accordingly, there exists a need for a device for transferring data between modules of a single unit which does not allocate any portion of the TDMA cycle to requesting or verifying whether or not the selected module is ready to process the data transfer request, as well as a device which minimizes the time necessary for transferring data between the modules.

SUMMARY OF THE INVENTION

The present invention provides a data transfer device and method for transferring data between digital signal processors ("DSPs") in a system utilizing TDMA designed to satisfy the aforementioned needs. Specifically, the invention comprises a novel device which provides maximum conservation of the processing bandwidth of the digital signal processors involved in the data transfer.

Accordingly, the present invention relates to a data transfer device for transferring data between a plurality of digital signal processors in a system utilizing TDMA. The data transfer device compresses a system controller coupled to a bus network, a plurality of dual port random access memory devices ("RAMs"), and a memory controller. Each dual port RAM comprises a first input/output ("I/O") port coupled to one of the plurality of digital signal processors, and a second I/O port coupled to the bus network. Each of the plurality of digital signal processors can access (i.e, read to and write from) the dual port RAM coupled thereto during a first predefined time period within the TDMA cycle. During a second predefined time period within the same TDMA cycle, the memory controller, under control of the system controller, transfers data directly between the dual port RAMs. Then, in a third predefined time period within the same TDMA cycle, the system controller can access the dual port RAMs coupled thereto.

As described in detail below, the data transfer device of the present invention provides important advantages. For example, the present invention utilizes a time based arbitration scheme which provides maximum conservation of the processing bandwidth of both the system controller and the DSPs. Furthermore, as compared to prior arbitration schemes, the present invention provides a substantial reduction in the number of components required to support the transfer of data between DSPs, and therefore provides a significant cost savings over prior art systems.

The invention itself, together with further objects and attendant advantages, will be understood by reference to the following detailed description, taken in conjunction with the accompanying drawings.

DETAILED DESCRIPTION OF THE DRAWINGS

Figure 1:
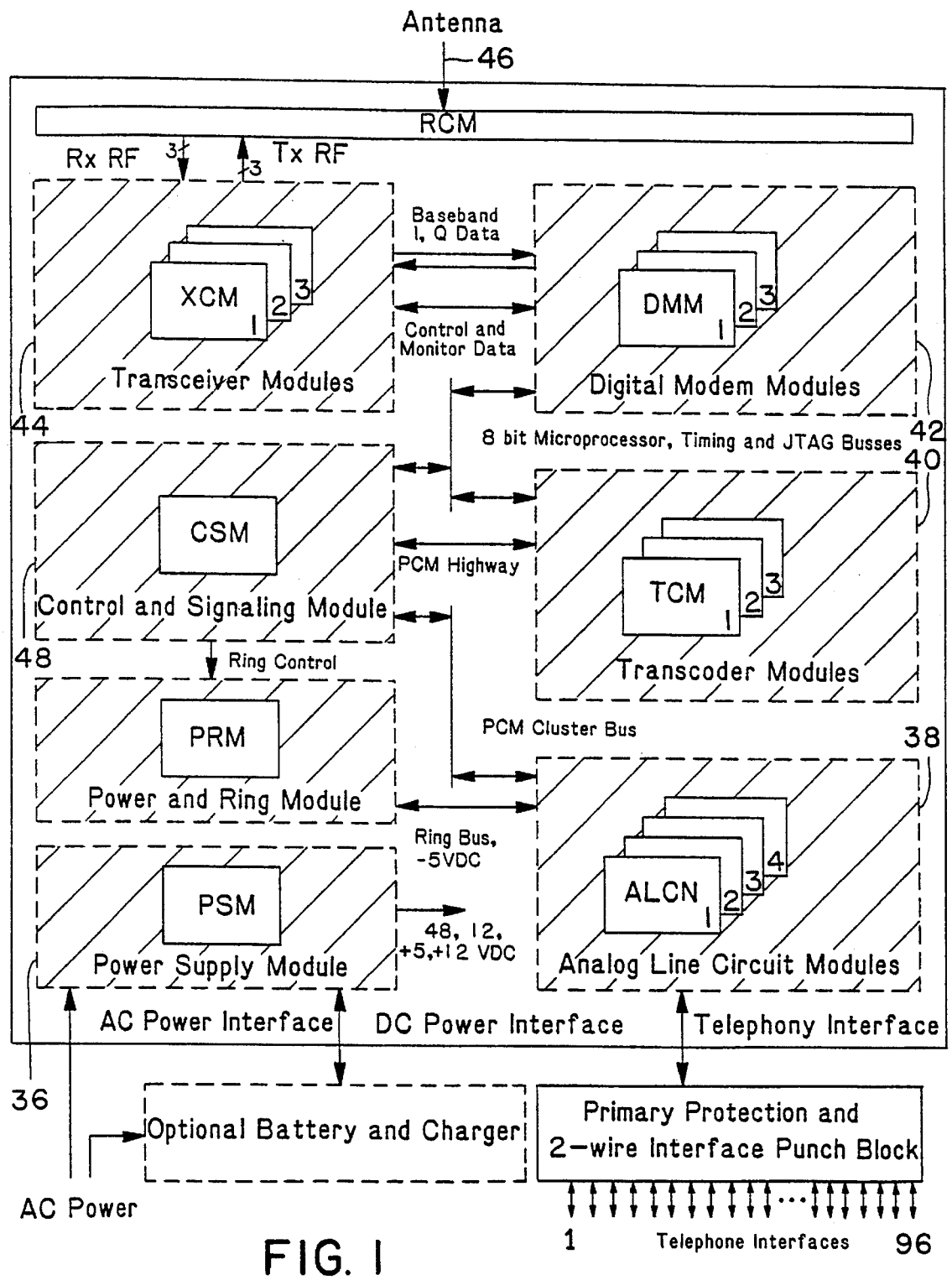
FIG. 1 is a block diagram of a unit of a cellular communication system which utilizes the present invention to transfer data.

One example of a unit of a cellular communication system which utilizes the present invention to transfer data between modules is shown in FIG. 1. The unit 36, which is referred to as a multiple subscriber unit ("MSU"), functions to interface up to 96 2-wire telephone circuits in fixed locations to a digital cellular telephony network utilizing TDMA, DSI and low rate voice encoding. The MSU 36 provides for the processing of up to 24 simultaneous calls.

The MSU 36 utilizes a TDMA processing format comprising a frame of 40 milliseconds which is split into 6 slots of 6.67 milliseconds each. The slots are utilized for voice data as well as network control and supervision data. Each slot represents one TDMA cycle.

For each phone call sourced or terminated by the MSU 36, slots are assigned and voice data is transferred only when a caller is speaking. For example, when a caller begins to speak into a phone connected to the MSU 36, the MSU 36 requests that a cell site base station assign a slot for the voice data on one of the RF frequencies assigned to the network. The cell site base station then assigns a currently unused slot which is-utilized until the caller finishes the speech spurt. At this time, the slot becomes available for other speech spurts within the network.

As shown in FIG. 1, the MSU 36 comprises analog line circuit modules 38 ("ALCNs"), which function to couple the 96 telephone lines to the MSU 36; transcoder modules 40 ("TCMs"), which function to low rate encode and decode the voice data; digital modem modules 42 ("DMMs"), which function to modulate and demodulate data; and transceiver modules 44 ("XCMs"), which interface the DMMs 42 to the MSU antenna port 46. The MSU 36 also contains a system controller 48, which is identified as the control and signalling module ("CSM"). The CSM 48 controls all other modules and facilitates the speech spurt slot assignment process. The number of TCMs 40, DMMs 42 and XCMs 44 installed within an MSU 36 vary according to the number of telephone lines and expected load on each line connected to the MSU 36. The MSU 36 utilizes the present invention to transmit data between the DMMs 42, TCMs 40 and the CSM 48.

Figure 2:
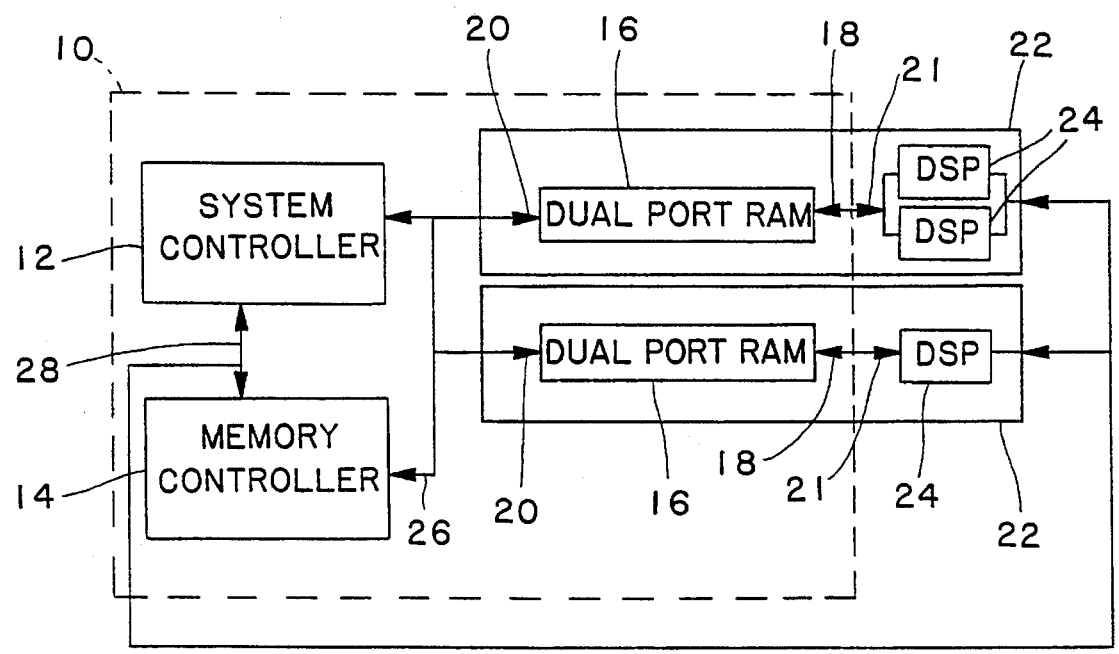
FIG. 2 is a schematic illustration of the data transfer device according to the present invention.

FIG. 2 illustrates a data transfer device 10 according to the present invention. The data transfer device 10 comprises a system controller 12, a memory controller 14 and a plurality of dual port RAMs 16, each of which comprises first and second I/O ports 18,20. These components are standard "off the shelf devices" known in the art. The system controller 12 typically comprises a microprocessor having processing capabilities sufficient to handle the supervisory tasks as required by the overall system. In the preferred embodiment, the system controller 12 comprises an Intel 80960 RISC processor, which contains a linked list direct memory access ("DMA") controller 14.

The system controller 12 controls the operation of each module 22 in a given unit, the number of which varies in accordance with the function of the unit, and the transfer of data between the modules 22. The system controller 12 also controls the transfer of data and commands between DSPs 24 located on different modules 22. For example, the system controller 12 corresponds to the CSM 48 of the MSU 36 of FIG. 1. The number of DSPs 24 contained in a given module 22 varies in accordance with the function to be performed by the module 22, as defined by the system requirements.

As shown in FIG. 2, the system controller 12 is coupled to the DMA controller 14 via a data bus 26 and a timing bus 28. The timing bus 28 is also coupled to every module 22 containing a DSP 24 which transmits or receives data from DSPs 24 located on other modules 22. Each DSP 24 contained in a given module 22 has an associated dual port RAM 16, preferably contained within the given module 22. Each dual port RAM 16 comprises a first I/O port 18 coupled to an I/O port 21 of the associated DSP 24, and a second I/O port 20 coupled to the data bus 26. Each dual port RAM 16 functions, in part, to interface its associated DSP 24 to the system controller 12 and the DMA controller 14 via the data bus 26. The system controller 12 includes each dual port RAM 16 coupled to a DSP 24 as part of its memory map. Each dual port RAM 16 is also memory mapped to its associated DSP 24.

Figure 4:
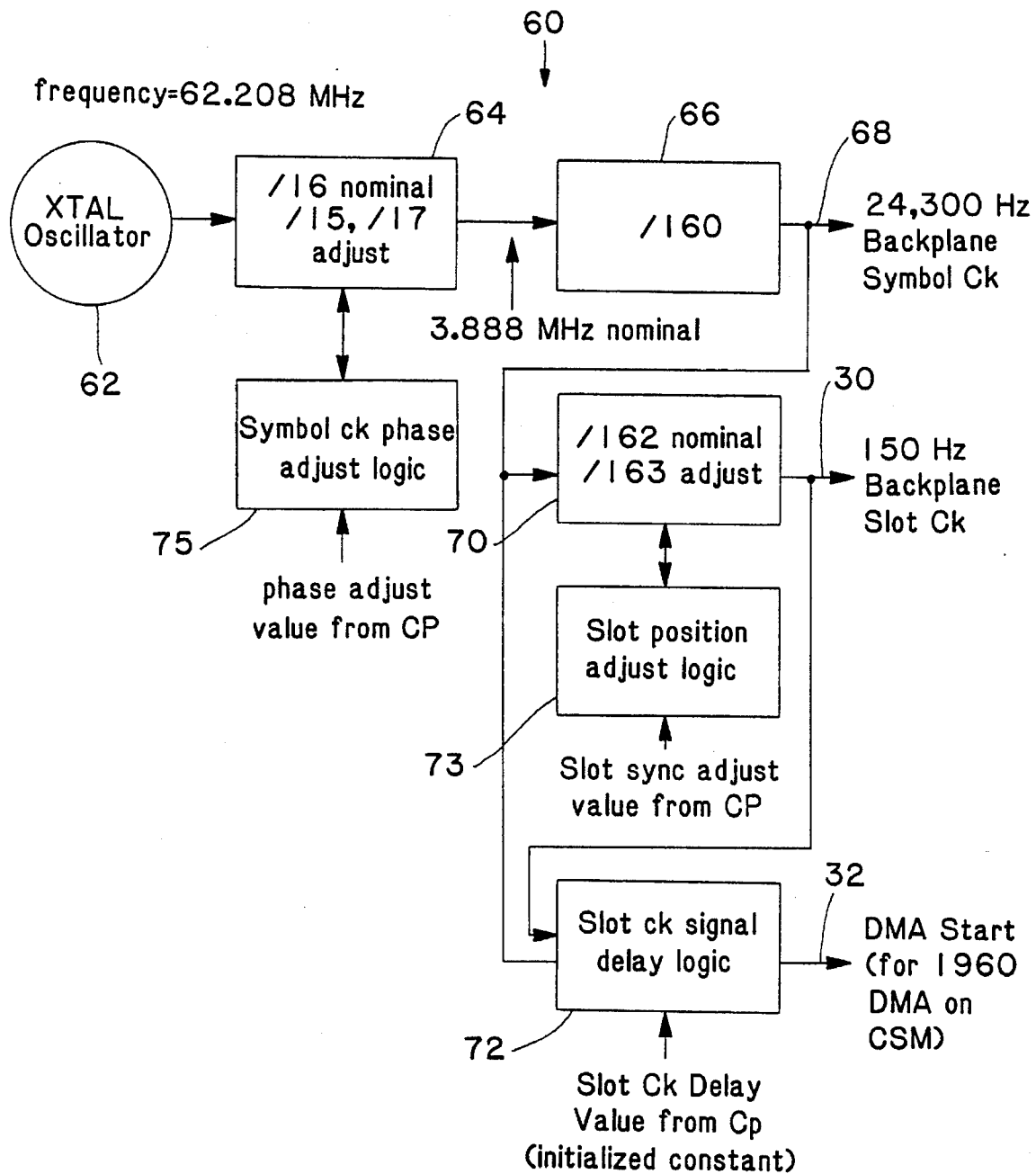
FIG. 4 illustrates the schematic of a timing generation circuit of the present invention.

As stated, the data transfer device 10 also comprises the timing bus 28 which is coupled between the system controller 12, the DMA controller 14 and each DSP 24 contained in the unit. The timing bus 28 functions to distribute a first periodic signal 30 to every DSP 24 coupled to the timing bus 28. The first periodic signal 30 is produced by a timing generation circuit 60, preferably contained within the system controller 12. As explained below, the timing generation circuit 60, such as shown in FIG. 4, produces the first periodic signal 30 which triggers the period in which the system controller 12 and the DSPs 24 can access the dual port RAMs 16 during the TDMA cycle.

As is clear from the discussion of the MSU 36 of FIG. 1, in a system utilizing TDMA it is typically necessary to transfer data between different modules 22 of a given unit during each TDMA cycle. This transfer of data between modules 22 is controlled by the system controller 12. Accordingly, a decrease in the duration of the TDMA cycle allocated for the transfer of data between modules 22 results in an increase in the time allotted for the system controller 12 and the individual DSPs 24 to perform different functions. In other words, the available processing bandwidth of the system controller 12 and the DSPs 24 is conserved for performing functions other than data transfer.

Figure 3:
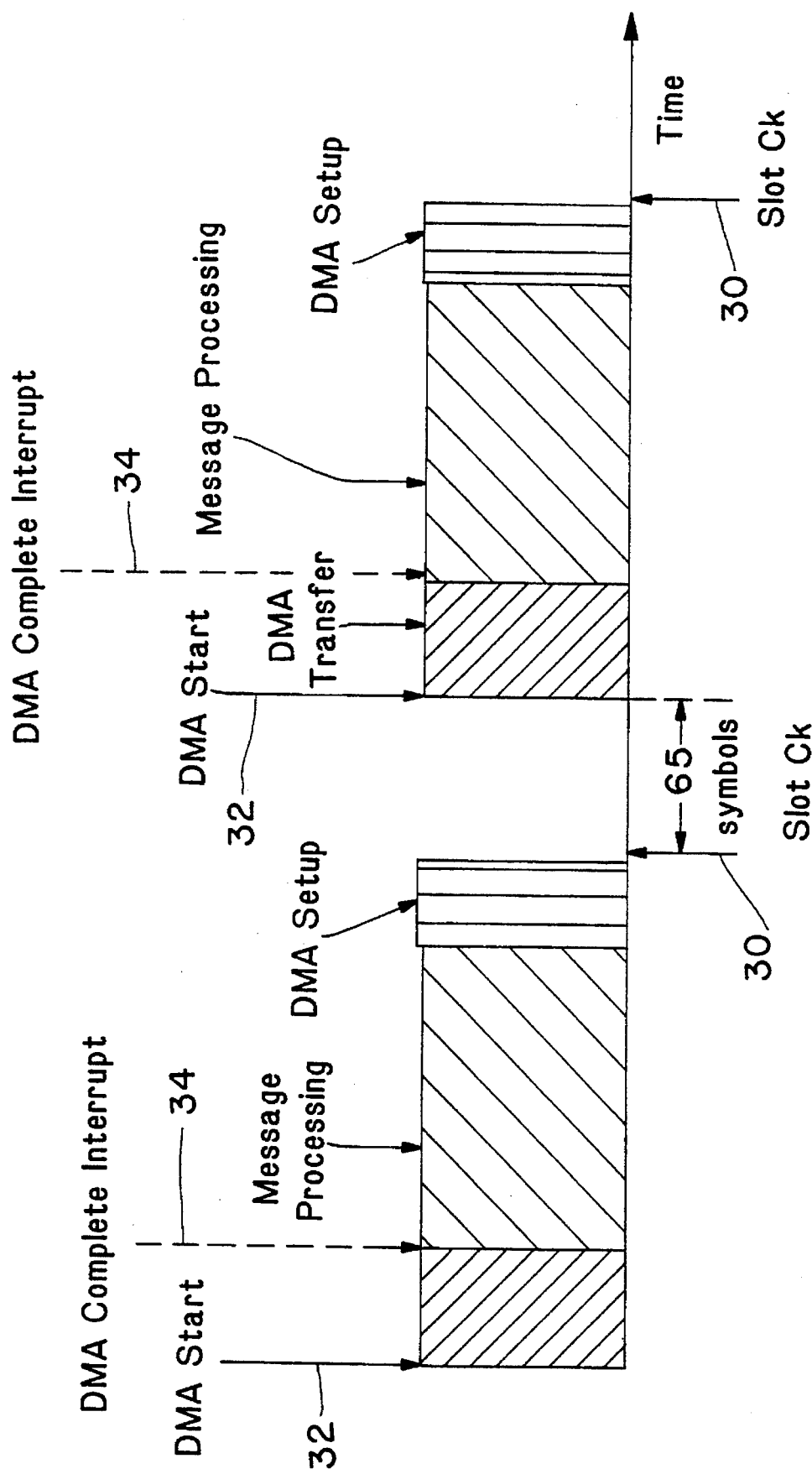
FIG. 3 is a timing diagram illustrating an exemplary TDMA cycle and the transfer of data according to the present invention.

FIG. 3 illustrates two exemplary TDMA cycles in which data is transferred between modules 22 by the data transfer device 10 of the present invention. According to the present invention, the start of the TDMA cycle is defined by the generation of the first periodic signal 30, referred to as a slot clock 30, by the timing generation circuit 60 of the system controller 12. The slot clock 30 is a periodic signal having a period defined by the system requirements concerning the minimum time required for each TDMA cycle. It is transmitted to each DSP 24 and the DMA controller 14 via the timing bus 28. Upon receipt of the slot clock 30, each DSP 24 is allowed to access the dual port RAM 16 coupled thereto during a first predefined time period. Each DSP 24 can continue to access its associated dual port RAM 16 until the DMA controller 14 receives a DMA start signal 32 from the system controller 12. The duration of the first predefined time period is variable in accordance with system requirements.

Upon receiving the DMA start signal 32, the DMA controller 14 is free to transfer data directly between the dual port RAMs 16 associated with different DSPs 24, or between any dual port RAM 16 and other RAM memory contained on the system controller 12. The linked list DMA controller 14, once initialized by the system controller 12, allows for the transfer of blocks of data between DSPs 24 without further intervention by the system controller 12. Thus, there is no need to access the time consuming I/O routines of the system controller 12.

FIG. 4 illustrates an exemplary timing generation circuit 60 for producing the slot clock 30 and the DMA start signal 32. As shown, the timing generation circuit 60 comprises a crystal oscillator 62 which is down converted by a first programmable divider 64 and a second divider 66 coupled in series to produce a clock signal 68 referred to as the symbol clock. The operation of the symbol clock 68 is explained in further detail below. The timing generation circuit 60 further comprises a third programmable divider 70 which down converts the symbol clock 68 to produce the slot clock 30. As stated above, the period of the slot clock 30 varies in accordance with the system requirements regarding the duration of a TDMA cycle.

The DMA start signal 32 is generated by delaying the slot clock 30 signal a predefined period of time. As shown in FIG. 4, this is accomplished by coupling the slot clock 30 to delay logic 72 contained in the timing generation circuit 60. The signal output by the delay logic 72 is the DMA start signal 32. The delay logic 72 can comprise, for example, a shift register. As is shown in FIG. 4, the delay logic 72 utilizes the symbol clock 68 as a reference. Similar to the frequency of the slot clock 30, the amount of delay provided is determined in accordance with the requirements of the system.

Once the DMA controller 14 has completed the transfer activity for the given TDMA cycle, it generates an interrupt signal 34 which is forwarded to the system controller 12. The time allotted for the DMA controller to transfer data is defined as the second predefine time period of the TDMA cycle. Upon receiving this interrupt signal 34, the system controller 12 during a third predefined time period processes the commands and messages, including those received during the preceding DMA transfer. This processing includes accessing the dual port RAMs 16 coupled thereto. After processing all messages and commands, the system controller 12 programs the DMA controller 14 to perform the data transfers necessary in the next TDMA cycle. Thereafter, upon receipt of the next slot clock 30 signal, the TDMA cycle and the foregoing transfer process is repeated.

An example of the timing sequence of the present invention, as utilized by the MSU 36 of FIG. 1 is explained with reference to FIGS. 3 and 4. The MSU 36 has a TDMA cycle of 6.67 milliseconds, which corresponds to a slot clock 30 having a period of 150 Hz. The timing generation circuit 60 produces the slot clock 30 by utilizing a crystal oscillator 62 having a frequency of 62.208 MHz, which is down converted by a factor of 16 by the first programmable divider 64, and thereafter divided by a factor of 160 and 162 by the second and third dividers 66,70, respectively. The symbol clock 68 is taken at output of the second divider 66 and has a frequency of 24.3 KHz. The slot and symbol clocks 30,68 are distributed to the DMMs 42 and the TCMs 40 via a backplane.

Accordingly, every 6.67 milliseconds the slot clock 30 of the MSU 36 illustrated in FIG. 1, triggers the DSPs 24 contained in the DMMs 42 and the TCMs 40 to access the associated dual port RAMs 16 during the first predefined time period. During this time, the slot clock 30 is being delayed by the delay logic 72 a predefined period of time so as to create the DMA start signal 32, which triggers the second predefined time period, wherein the DMA controller 14 performs the transfer process for the given cycle. After completion, the DMA controller 14 issues an interrupt signal 34 which triggers the third predefined time period of the TDMA cycle, wherein the CSM 48 is allowed to access the dual port RAMs 16 coupled thereto. The MSU 36 is designed such that the DMA controller never transfers data for more than 500 microseconds of the 6.67 millisecond TDMA cycle. This provides both the CSM 48 and the DSPs on the DMMS and the TCMs a wide margin for accessing the dual port RAMs, approximately 3 milliseconds each.

When the MSU 36 is receiving information from an external station, it is necessary for the slot clock 30 of the MSU 36 to synchronize with the clock associated with the incoming signal. Accordingly, upon initial acquisition, a DMM module 42 compares an air interface start of frame signal associated with the detected data to the slot clock 30 running in the MSU 36. If the slot clock 30 of the MSU 36 is not synchronized with the air interface start of frame, the DMM 42 sends an error signal to the CSM 48 which allows the CSM 48 to adjust the start time of the slot clock 30.

The CSM 48 performs this function by changing the slot count from 162 to 163 symbols for the number of consecutive slots required to align the MSU 36 slot clock 30 with the received slot clock position. In other words, the CSM 48 can delay the next slot clock 30 signal up to one TDMA cycle. This is accomplished by the slot position adjustment logic circuit 73, for example a shift register, contained in the timing generation circuit 60, which operates to control the third programmable divider 70 as required. Accordingly, the duration of a TDMA cycle is never truncated and every processor on each port of the dual port RAM 16 has a minimum of 3 milliseconds of access time, even during a synchronization event. Finally, adjustments are made to the slot and symbol clocks while in lock with the received signal in order to compensate for oscillator frequency offset. These adjustments, which are made by a symbol clock phase adjustment logic circuit 75 contained in the timing generation circuit 60, are minimal and do not compromise access time.

The data transfer device 10 of the present invention provides numerous advantages. First, by avoiding the use of "busy" or "semaphore" arbitration of the dual port RAMs 16, the time based arbitration of the present invention provides maximum conservation of the processing bandwidth of both the system controller 12 and the DSPs 24.

The use of a liked list DMA controller 14 also provides for conservation of processing bandwidth and a reduction in the number of components required to transfer data between modules 22.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A device for transferring data between a plurality of digital signal processors in a system utilizing time division multiple access, said device comprising:

a system controller coupled to a bus network;

a plurality of dual port random access memory devices, each of which has a first port coupled to one of said plurality of digital signal processors and a second port coupled to said bus network; and a linked list direct memory access controller for transferring data between said dual port random access memory devices, said direct memory access controller coupled to said bus network and controlled by said system controller;

said system controller further comprising a timing generation circuit for generating a first periodic signal, said first periodic signal being coupled to each of said plurality of digital signal processors and said memory access controller, said first periodic signal defining the start of said first predefined time period; and a delay circuit for delaying said first periodic signal a predetermined amount so as to create a start signal defining the beginning of said second predefined time period, said start signal being coupled to said memory controller.

2. A device for transferring data between a plurality of digital signal processors according to claim 1, wherein said system controller and said memory controller are formed in a single integrated circuit.

3. A device for transferring data between a plurality of digital signal processors according to claim 2, wherein said linked list direct memory access controller allows the transfer of blocks of data between said dual port random access memory devices in a single transfer.

4. A device for transferring data between a plurality of digital signal processors according to claim 1, wherein said system controller comprises a memory map which includes said dual port random access memory devices coupled to said plurality of digital signal processors.

5. A device for transferring data between a plurality of digital signal processors according to claim 1, further comprising a timing bus coupled between said timing generation circuit, said delay circuit and said plurality of digital signal processors so as to allow said first periodic signal to be transmitted to said plurality of digital signal processors and said memory controller.

6. A device for transferring data between a plurality of digital signal processors according to claim 1, wherein at least one of said plurality of digital signal processors comprises a memory map which includes said dual port random access memory device coupled thereto.

7. A method for transferring data between a plurality of digital signal processors in a system utilizing time division multiple access, comprising:

allocating by a system controller a first predefined time period within a TDMA cycle in which each of said plurality of digital signal processors access a dual port random access memory device coupled thereto, allocating by the system controller a second predefined time period within said TDMA cycle in which a linked list direct memory access controller transfers data between said dual port random access memory devices, and allocating by the system controller a third predefined time period within said TDMA cycle in which the system controller accesses said dual port random access memory devices coupled to said plurality of digital signal processors.

8. The method of claim 7, wherein said first, second and third predefined time periods do not coincide with one another.

9. The method of claim 7, wherein said linked list direct memory access controller transfers blocks of data at the same time.

10. The method of claim 7, wherein said system controller comprises a memory map which includes said dual port random access memory devices coupled to said plurality of digital signal processors.

11. The method of claim 7, wherein each of said plurality of digital signal processors comprises a memory map which includes said dual port random access memory device coupled thereto.

12. The method of claim 8, further comprising generating a periodic slot clock signal which defines the start of a TDMA cycle and said first predefined time period.

13. The method of claim 12, further comprising delaying said first periodic signal a predetermined amount so as to create a start signal defining the beginning of said second predefined time period, said start signal being coupled to said memory controller.

14. The method of claim 12, wherein said periodic slot clock signal can be delayed up to one TDMA cycle so as to allow said periodic slot clock signal to synchronize with a periodic clock signal received from an external source such that the duration of said first, second and third predefined time periods are maintained.

15. The method of claim 7, wherein the duration of said first, second and third predefined time periods are variable in accordance with system requirements.

16. A device for transferring data between a plurality of digital signal processors in a time division multiple access system, said device comprising:

a bus network;

a system controller coupled to said bus network, said system controller further comprising a timing generation circuit for generating a first periodic signal, said first periodic signal being said to each of said plurality of digital signal processors, said first periodic signal defining the start of a first predefined time period;

a plurality of random access memory devices, each of which is coupled to one of said plurality of digital signal processors and to said bus network;

a memory controller for transferring data between said random access memory devices, said memory controller coupled to said bus network and controlled by said system controller;

a delay circuit for delaying said first periodic signal for a predetermined amount of time so as to create a start signal defining the beginning of a second predefined time period, said start signal being coupled to said memory controller; and a timing bus coupled between said timing generation circuit, said delay circuit and said plurality of digital signal processors so as to allow said first periodic signal to be transmitted to said plurality of digital signal processors and said memory controller.

17. The device of claim 16, wherein said memory controller comprises a direct memory access controller.

18. The device of claim 16, wherein at least one of said digital signal processors encodes and decodes speech data.

19. An apparatus for receiving a plurality of telephone signals carried by a plurality of telephone lines and generating a concentrated telephone signal to be transmitted by an antenna over a radio communication link comprising:

a telephone line circuit module receiving the plurality of telephone lines and producing the plurality of respective telephone signals;

a first digital signal processor comprising an encoder receiving the plurality of telephone signals from the telephone line circuit and producing encoded telephone signals;

a system controller coupled to a bus network, said system controller receiving the encoded telephone signals and generating a concentrated telephone signal having a plurality of speech slots, each of the encoded telephone signals assigned to at least one of the speech slots;

a second digital signal processor comprising a modem responsive to said system controller, said modem modulating said concentrated telephone signal to produce a modulated signal;

a plurality of dual port random access memory devices, each of which has a first port coupled to said digital signal processors and a second port coupled to said bus network;

a memory controller for transferring data between said dual port random access memory devices, said memory controller coupled to said bus network and controlled by said system controller; and a transceiving module coupled to the antenna and responsive to said modem, said transceiving module transmitting said modulated signal over the radio communication link via the antenna.

20. A device for transferring data between a plurality of digital signal processors according to claim 1, further comprising an adjustment circuit for synchronizing the first periodic signal with a periodic signal input from an external source.

* * * * *